July 4, 1967  F. P. D'ESOPO  3,329,763
RACEWAY
Filed Sept. 13, 1965
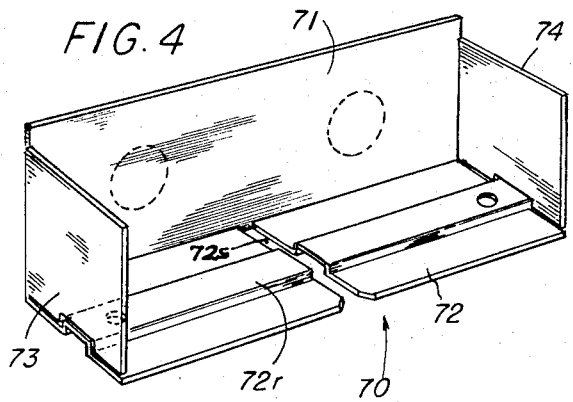
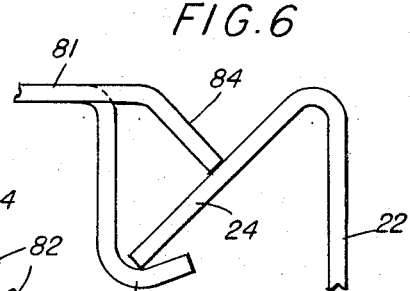
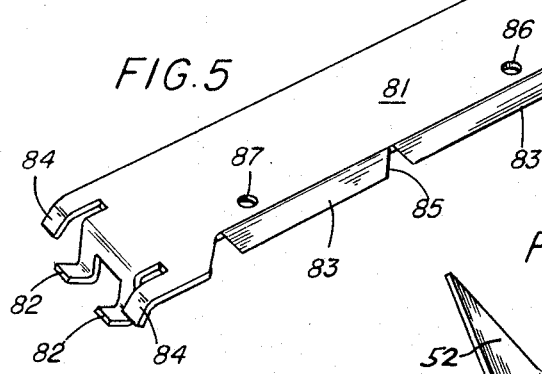
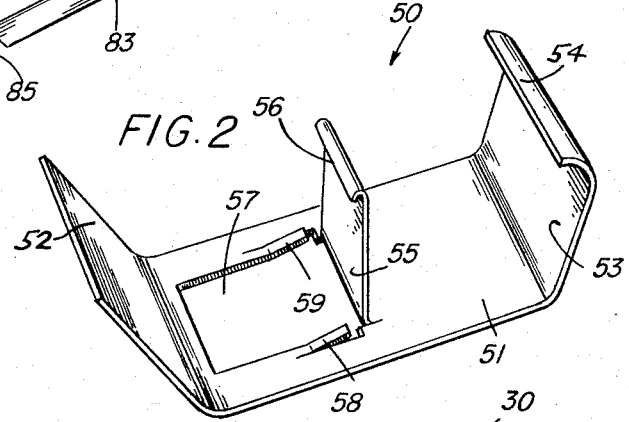
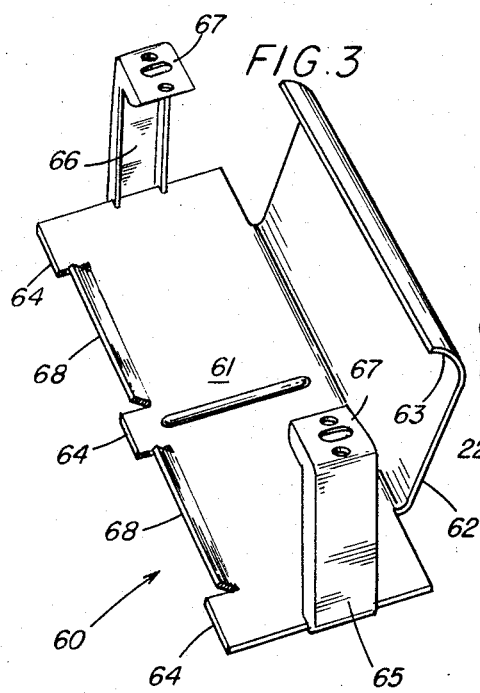
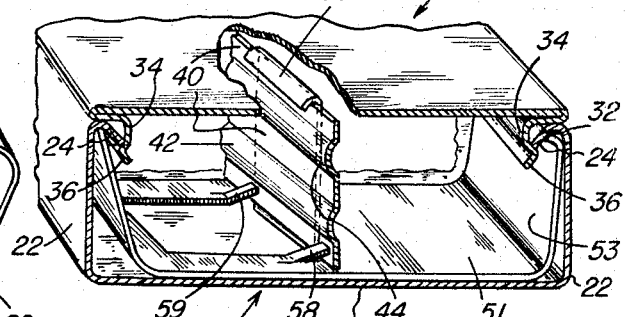
INVENTOR.
Francis P. D'Esopo
By his attorneys
Howson and Howson.

United States Patent Office 3,329,763
Patented July 4, 1967

3,329,763
RACEWAY
Francis P. D'Esopo, West Hartford, Conn., assignor to The Wiremold Company, West Hartford, Conn., a corporation of Connecticut
Filed Sept. 13, 1965, Ser. No. 486,748
16 Claims. (Cl. 174—70)

This invention relates to raceways for electric wiring and, more particularly, to compartmented raceways and the means and parts to compartmentalize a raceway. The invention also relates to fixtures useful in supporting electric wiring devices in the compartments or channels of such a raceway.

There is a need for raceways which can carry wires of different kinds of circuits which may be entirely separate in purpose and function, as well as in current and voltage which they carry. It is essential that wires for such diverse uses and functions be completely separated and isolated from each other by means which prevents entirely and accidental interengagement or interconnection.

When it is desired to compartmentalize a raceway in the field while installation is taking place, the ability to assemble and compartmentalize should be quick and easy for economical use of time and to keep costs of fabrication and assembly as low as possible.

Therefore, it is an object of this invention to provide an improved compartmented raceway, the component parts of which may be economically fabricated and may be assembled quickly and easily in the field.

Another object is to provide parts usable in a raceway which enable the raceway to be used as a single raceway or converted into a compartmented raceway in the field during installation.

Another object is to provide for said conversion by parts which may be easily and quickly snapped into place without the use of tools and can be used to join adjacent raceway sections.

Another object is to provide supports for wiring devices which can be snapped into place in a compartmented raceway to support the wiring device at any desired point along the raceway.

Other objects and advantages of the invention will appear as the invention is described.

In the drawing:

FIG. 1 is a cross section view of a raceway embodying the invention looking at the raceway endwise.

FIG. 2 is an exploded perspective view of a partition supporting member and a fragment of the partition.

FIG. 3 is a perspective view of a wiring device support developed for use in connection with the raceway.

FIG. 4 is a perspective view of an end closure for the raceway of FIG. 1.

FIG. 5 is a perspective view of another form of wiring device support.

FIG. 6 is a greatly enlarged fragmentary view of the joint between the support of FIG. 5 and the jaw of the raceway.

Referring to the drawing, the raceway may be of the type disclosed in my copending application Ser. No. 409,651, filed Nov. 9, 1964.

The raceway comprises a base section designated generally by numeral 20, and a cover section designated generally by numeral 30. The base is formed of any suitable material which possesses substantial rigidity when formed as herein described and also is sufficiently flexible to prevent the connection and disconnection of auxiliary parts such as elbows, converter couplings, connection covers and the like which are normally needed and used in raceway installations. The material should also be capable of being easily formed and shaped, but not too readily bent and should be non-frangible when dropped or struck, kicked or hammered. Preferable materials are ductile iron and steel.

The base is of generally rectangular shaped channel form in cross section having a bottom wall 21 and side walls 22, with the edges of its side walls reversely bent inwardly at an angle of approximately 45° to the planes of the sides of the channel to form a jaw 24 to engage the cover, as hereinafter will more fully appear. The in-turned jaw will preferably run the full length of the raceway and may be approximately one-quarter of an inch wide in a raceway of about one and five-eighths inches depth.

The cover section of the raceway may be formed from a strip of medium gauge sheet metal which has its opposite edges 32 folded over against the under surface of the cover for a short distance. The edges are then curved downwardly or inwardly of the raceway to provide a lip 34 with a bearing surface along the lip normal to the jaw 24. When the cover and base sections are joined together, the lip is then inturned to provide a guide surface 36 which is adapted to engage the jaw 24 when the cover is being applied to the base and to move the sides of the base section sufficiently to permit the jaws to slide over the concave surface of the lip after which the edge of the jaw 24 will engage the surface 34 longitudinally along the lip and at substantially a right angle.

Referring to FIG. 1, the jaw 24 exerts a force against the lip surface 34 with a horizontal or inward component and a vertical, transversely inward component. The horizontal component tends to pull the cover against the bend of the base lip, making a tight joint between the cover and the base. The vertical component is counteracted by an equal and opposite component of the lip.

To divide the raceway longitudinally into two parallel compartments or channels alongside each other, a partition plate stamped from sheet metal in the form of a strip 40 is provided, running longitudinally of the raceway along its center. To provide stiffness, the partition has one or more grooves or beads 42, 44 pressed into it and running lengthwise of the partition. Two such beads are shown in the form of the invention illustrated. The height of the partition is preferably approximately equal to the depth of the base section 20 of the raceway less twice the thickness of the metal used to make the hereinafter described support members designated generally by the numeral 50.

For supporting the partition, the support member 50 is stamped from sheet metal as a wide rectangular strip or plate whose central portion is adapted to lie on the raceway floor 21 when the support member 50 is assembled in the raceway.

The ends 52, 53 of the support are bent up at approximately 70° angles from the central portion, the end 53 having its edge reversely bent inwardly forming a lip 54.

The support member is of sufficient resilience that when the edge of end 52 is inserted under one jaw 24 of the raceway and the support is pressed inwardly, the support will flex enough to allow the lip 54 to snap under the other jaw of the raceway. The support will then be resiliently and frictionally held with its central portion against the floor of the raceway and with the edge of the end 52 under one jaw and the lip 54 under the other jaw of the raceway.

To hold the partition upright perpendicular to the floor of the raceway, a rectangular portion of the bottom part 51 of the support is struck up, forming a wide flat post 55 and leaving a rectangular opening 57. The free or upper edge of the post is reversely bent, forming a lip 56. Adjacent the joint of post 55 of the bottom 51 of the support along the edges of the opening 57, feet 58 and 59 are lanced upwardly with the ends that are nearer the post being free. The feet 58, 59 are resilient so that when the partition 40 has its upper edge inserted under the lip 56 and its lower edge pushed toward the bottom of the post, the lower edge will pass over the feet 58, 59 flexing them downwardly until the partition lies flat against the post at which time the feet 58, 59 will snap up holding the partition against retrogressive movement and maintaining it upright against the post 55.

Several of said supports may be located along the raceway at spaced positions, thus affording a support for the partition at two or more points and holding the partition in substantially rigid condition.

It will be noted that the supports 50 are adapted to be snapped into place and that the posts 55 and feet 58, 59 are so constructed that the partition may be snapped into place against them, all without the use of tools.

After the supports are all in place and the partition also is in place and the conduit wires are laid in the separate parallel compartments or channels, the cover 30 may be snapped onto the base section, closing the raceway.

The supports 50 also are adapted to serve another function. When two raceway sections abut, a support 50 may be snapped into place over the joint, thereby connecting the sections and closing the joint between them and holding them in alignment.

To locate and support wiring devices such as switches, receptacles, lamp sockets or the like at one or more selected points along the raceway in one or the other of the channels or compartments, wiring device supports designated generally by the numeral 60 are provided. Such supports are stamped from sheet metal with a flat bottom part 61 of generally rectangular shape with an upwardly extending side 62 having a reversely bent inturned lip 63 like the end 53 and lip 54 of the partition support 50. Extending from the opposite edge of the bottom 61 are one or more lugs 64; and the metal between them is bent upwardly at an acute angle forming stops 68. The lugs may be inserted under the partition until the stops abut the partition. Due to the fact that the partition rests upon the support 50, the bottom edge of the partition is spaced from the floor of the raceway by a distance equal to the thickness of the metal used to make the support 50. Then the wiring device support may be pressed down toward the floor of the raceway during which movement the side 62 will flex inwardly as lip 63 passes the jaw 24 of the raceway, until the lip 63 snaps under the jaw 24 and against the wall of the raceway. The wiring device support is then held resiliently and in place between the partition and one wall of the raceway with the lip 63 under the jaw 24.

For mounting the wiring device above the raceway floor, arms 65, 66, formed integrally with the bottom 61 of the wiring device support, extend up perpendicularly to the bottom from opposite ends thereof. The upper extremities of the arms are bent toward each other, forming tabs 67 parallel to the floor of the raceway. Tapped holes are formed in the tabs for screws by which the mounting strap of a conventional wiring device (not shown) may be secured between the tabs with the device in the channel. The level at which the wiring device will then be located will ordinarily and preferably be such that when a conventional face plate is fastened upon and over the wiring device, the face plate will lie on the top surface of the raceway cover 30. The cover will conveniently have an opening cut into it to accommodate the wiring device and the face plate will cover this opening.

Another arrangement for supporting wiring devices along the raceway at any desired position in either compartment is illustrated in FIG. 5. In this arrangement, a pair of bridging brackets designated generally by the numeral 80 extends across the base section. Each bracket comprises a flat strip 81, one edge 83 of which is turned down at a right angle with a notch 85 formed therein in position to permit passage of and to support the upper edge of the partition 40.

On each end of the bracket 80 at each corner are formed a pair of extensions comprising an underhanging jaw 82 and an overhanging lip 84, side by side and spaced from one another. The jaws 82 are formed by downwardly and reversely bending thin fingers of metal while the lips 84 are formed by straight extensions in continuation of the bracket and downwardly bending the lips of such extensions.

As the bracket is pressed down across the top of the base section, the jaws 82 snap under the jaws 24 of the base section and the edges of the lips 84 press perpendicularly against the upper surface of the base section jaws 24. The bracket is thus held firmly against further inward movement as well as against withdrawal.

Tapped holes 86, 87 are formed in the middle portion of the bracket over the separate compartments of the raceway. By spacing apart a pair of brackets a distance such that their holes 86, 87 will register with the holes in a conventional mounting strap of a common wiring device, such devices can be secured in the compartments at desired locations at the proper level so that a conventional wiring device face plate will lie upon the raceway cover and close the hole therein where the device is positioned.

To close the end of the raceway, a blank-end fitting designated generally by the numeral 70 as illustrated in FIG. 4, may be provided. The fitting 70 may be stamped from sheet metal with a flat end plate 71 bent up from a bottom part 72 and opposite side plates 73, 74 bent perpendicularly to the end plate 71 and parallel to each other, extending in the same direction. The bottom part 72 is provided with a rib 72r extending throughout the length of the bottom; and a slot 72s is cut or stamped transversely across the bottom to receive the bottom edge of the partition 40.

The distance between the outside surface of the side plate 73, 74 is less than the distance between the side walls 22 of the raceway so that the end fitting may be slid into the end of the raceway. Also, so that the end fitting 70 may be slid into the end of the raceway, the height of the side plate 73, 74 is such as to permit them to slip under the jaws 24 of the raceway when the bottom 72 of the support lies on the floor of the raceway. The height of the end wall 71 of the end fitting is such that the top edge of said wall will be flush with the cover of the raceway when all are assembled.

From the foregoing, it will be apparent that the invention provides for quickly transforming a single channel raceway into a compartmented raceway having parallel channels or compartments, by snapping into place into the raceway easily and economically fabricated and manipulated supports for a central partition of simple form, and then snapping the partition into place. Then, if desired, easily and economically fabricated and manipulated wiring device supports may be snapped into place in one or more compartments and wiring devices located and secured in the desired locations.

Although supports for making two compartments are described and illustrated, obviously more than one parallel partition could be supported if more than one post 55 is provided on each support.

Modifications within the scope of the invention will occur to those skilled in the art. Therefore, the invention is not limited to the exact form and detail illustrated and described.

What is claimed is:

1. A raceway for a surface wiring duct having a base section and a cover section, said base section having a floor and sides with reversely bent longitudinal edges and said cover section having its longitudinal edges formed to engage the longitudinal base edges and hold said cover section on said base section, in combination with a partition supporting means comprising a bottom adapted to lie on said base floor and having sides with longitudinal edges adapted to engage with said base section longitudinal edges to hold said partition supporting means fixedly in said base section, a partition running lengthwise of said raceway perpendicular to the floor, and holding means on said partition supporting means extending from its bottom toward said cover.

2. The combination as claimed in claim 1 wherein at least one side of said partition supporting means is resilient and may be snapped under one of the edges of said base section when the other side of the partition supporting means is under the other edge of said base section.

3. The combination as claimed in claim 1 wherein said holding means is integral with said partition supporting means and is struck up from the floor of the latter.

4. The combination as claimed in claim 1 having means bent up from the bottom of said partition supporting member maintaining one edge of said partition against said partition holding means, said holding means having a formation adjacent the other edge of said partition to engage and maintain it in said perpendicular position.

5. The combination as claimed in claim 1 having means adjacent one edge of the partition to hold said edge against the holding means and means adjacent the other edge of the partition to hold said other edge against said holding means.

6. The combination as claimed in claim 4 wherein said formation comprises a reversely bent edge of said holding means, and said bent-up means comprise feet struck up from the bottom of said partition supporting means.

7. The combination as claimed in claim 2 having means bent up from the bottom of said partition supporting member maintaining one edge of said partition against said partition holding means, said holding means having a formation adjacent the other edge of said partition to engage and maintain it in said perpendicular position.

8. The combination as claimed in claim 7 wherein said formation comprises a reversely bent edge of said holding means, and said bent-up means comprise feet struck up from the bottom of said partition supporting means.

9. The combination as claimed in claim 1 having an end closure fitting over the end of the raceway and having a slot to receive one of the longitudinal edges of said partition.

10. The combination as claimed in claim 9 wherein the end closure has sides fitting within the sides of said base section and a bottom lying upon the floor of said base section and formed to provide said slot.

11. The combination as claimed in claim 1 having means to position a wiring device in either compartment of said raceway, said positioning means having a portion engaging said partition and a portion engaging one of said longitudinal edges of the base section, and means on said positioning means to support a wiring device.

12. The combination as claimed in claim 11 wherein the portion engaging the longitudinal edge of said base section is flexible and is adapted to be snapped under said longitudinal edge after said partition-engaging portion is in place.

13. The combination as claimed in claim 1 having means to position a wiring device in either compartment of said raceway, said positioning means having a portion engaging said partition and a portion engaging at least one of the longitudinal edges of the base section, and means on the positioning means to support a wiring device.

14. The combination as claimed in claim 1 having means to position a wiring device in either compartment of said raceway, said positioning means extending across the raceway and engaging the longitudinal edges of the raceway, and means on said positioning means to support a wiring device.

15. The combination as claimed in claim 14 where the positioning means comprise a pair of spaced transverse members, each having means to support a wiring device extending longitudinally of the raceway.

16. The combination as claimed in claim 14 wherein the ends of said positioning means have means engaging under said longitudinal raceway edges and means engaging the upper surfaces of said edges.

No references cited.

LARAMIE E. ASKIN, *Primary Examiner.*